(12) United States Patent
Bechaz et al.

(10) Patent No.: US 6,293,820 B1
(45) Date of Patent: Sep. 25, 2001

(54) CATCH FOR FASTENING TO A SUPPORT RAIL

(75) Inventors: Bernard Bechaz, Caluire; Sylvain Barrat, Belleville sur Saone, both of (FR)

(73) Assignee: Entrelec SA, Lyons (FR)

( * ) Notice: Subject to any disclaimer, the term of this patent is extended or adjusted under 35 U.S.C. 154(b) by 0 days.

(21) Appl. No.: 09/657,322

(22) Filed: Sep. 7, 2000

(30) Foreign Application Priority Data

Sep. 16, 1999 (FR) .................................................. 99 11801

(51) Int. Cl.⁷ .................................................. H01R 13/60
(52) U.S. Cl. ............................................ 439/532; 439/716
(58) Field of Search ..................... 439/532, 716

(56) References Cited

U.S. PATENT DOCUMENTS

| | | | |
|---|---|---|---|
| 4,878,859 | * 11/1989 | Haller et al. | 439/716 |
| 5,103,373 | 4/1992 | Rusch et al. | 361/335 |
| 5,174,767 | * 12/1992 | Diekmann et al. | 439/716 |
| 6,146,213 | 11/2000 | Yoon | 439/716 |

FOREIGN PATENT DOCUMENTS

| | | | |
|---|---|---|---|
| 3225855 | * 1/1984 | (DE) | 439/716 |
| 37 32 434 A1 | 4/1989 | (DE) . | |
| 44 09 206 C1 | 5/1995 | (DE) . | |
| 197 09 811 A1 | 9/1998 | (DE) . | |

* cited by examiner

Primary Examiner—Tho D. Ta
(74) Attorney, Agent, or Firm—Oliff & Berridge, PLC

(57) ABSTRACT

This fastening catch comprises two relatively sliding pieces (6), each piece exhibiting a hook (12) intended to allow latching to the support rail. A first sliding piece (6) exhibits snap-engagement mechanism (20) and the second sliding piece (6) comprises complementary snap-engagement mechanisms (16, 18) so that these snap-engagement mechanisms cooperate when the sliding pieces (6) are in the unlatched position and possibly also in the latched position.

17 Claims, 3 Drawing Sheets

CATCH FOR FASTENING TO A SUPPORT RAIL

Figure 1:
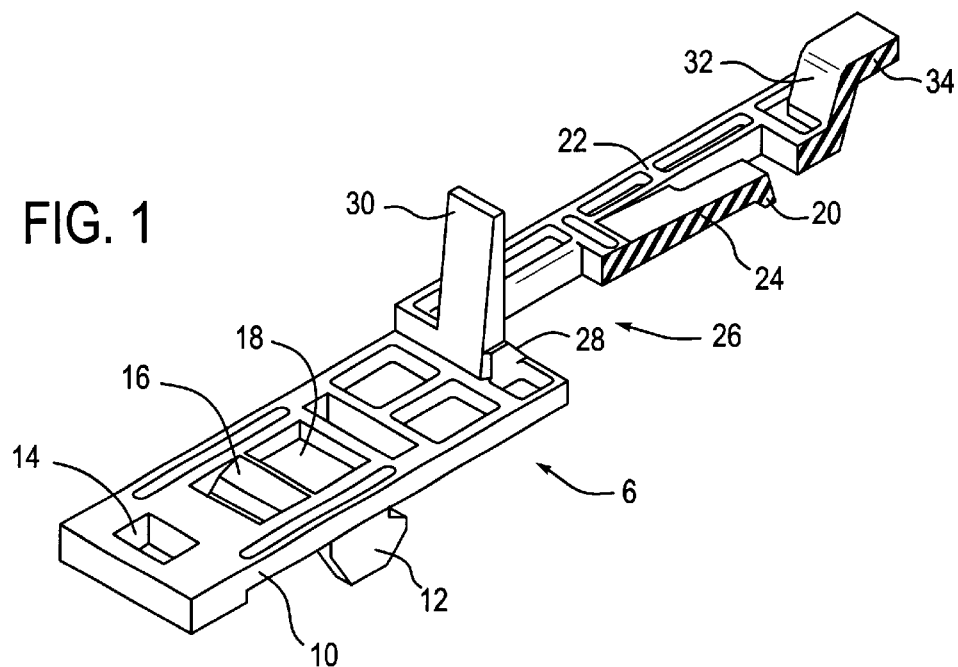

The present invention relates to a catch for fastening to a support rail.

Such a fastening catch is used for mounting an electrical connection device such as for example a terminal block or a fuse holder on a support rail. When the device to be mounted is relatively small in size, the fastening to the support rail is effected for example by snap-engagement. Such fastening is suitable since the force required to carry out this fastening is relatively small. For electrical devices of larger sizes, a maneuverable latching system also referred to as a fastening catch is used.

The support rails used are profiled rails exhibiting a U-shaped cross section. The free end of the branches of the U is folded back substantially at right angles toward the outside and thus forms two lateral wings. The known fastening catches generally comprise two hooks, one at least of which is moveable, each intended to grasp a lateral wing from below.

The documents EP-0 326 624 and DE-41 08 072 disclose for example a fastening catch.

A drawback of these fastening catches is that they are always prestressed in the latching position. This does not facilitate their mounting on the support rail. With these fastening catches one also has an access problem. Specifically, it is sometimes difficult within an electrical cabinet to access the fastening catch in order to carry out latching or unlatching on the support rail.

The purpose of the present invention is to provide a fastening catch allowing latching and unlatching on a support rail easier than for the fastening catches of the prior art.

For this purpose, the fastening catch which it proposes is a catch for fastening an electrical housing to a support rail, comprising two relatively sliding pieces, each piece exhibiting a hook intended to allow latching to the support rail.

According to the invention, a first sliding piece exhibits snap-engagement means and the second sliding piece comprises complementary snap-engagement means so that these snap-engagement means cooperate when the sliding pieces are in the unlatched position and possibly also in the latched position.

In this way, it is possible to retain the fastening catch in the unlatched position without outside intervention. Thus, in order to place the housing in position on the support rail, it is sufficient to offer it to the rail, without worrying about the fastening catch. Likewise, to remove the housing from the support rail, it is sufficient to unlatch the fastening catch and detach it. During these operations, it is entirely unnecessary to act on the fastening catch. Therefore, one can more easily access the support rail, even when the space around the latter is congested.

Retention in the latched position by snap-engagement is optional since a spring or indeed other elastic means may be provided for retention in this position.

The first sliding piece of a fastening catch according to the invention comprises, for example, a second hook mounted elastically in a direction substantially perpendicular to the direction of movement of the sliding pieces and the second sliding piece then comprises for example two grooves intended to receive the end of the second hook. The hook enters a groove when the catch is in the unlatched position whilst it enters the second groove in the latched position.

In this embodiment, the second hook may be disposed at the end of an elastic dog cut out from the sliding piece.

In a fastening catch according to the invention, provision may be made for two sliding pieces to overlap, for a sliding piece to comprise at one of its ends a recess intended to receive the blade of a screw-driver and for an end of the other sliding piece to exhibit at the height of the recess a raised rim intended to serve as bearing for the screw-driver. In this embodiment, in a single maneuver, one acts simultaneously on the two sliding pieces. One therefore acts in one movement on both sides of the support rail.

To create a force for restoring to the latched position, there may be provided on each sliding piece an elastic blade running perpendicularly to the direction of movement of the sliding pieces toward the inside of the electrical housing and intended to bear against an inside wall of this housing in such a way as to prestress each sliding piece toward the latching position.

Advantageously, the two sliding pieces are identical and they each exhibit the form of two elongate plates disposed one along the extension of the other with a heightwise offset, a lateral notch allowing the nesting of the two sliding pieces being provided substantially in the middle of each sliding piece. This makes it possible very substantially to reduce the cost price of a fastening catch since on the one hand a single type of piece requires to be constructed and on the other hand mounting of the fastening catch is easy to carry out.

In this embodiment, an edge of the notch is advantageously beveled, so that in the mounted state of the catch, the two beveled edges face one another. It is then possible to bring a screw-driver level with these beveled edges so as to act on the sliding pieces. When the housing is mounted on the support rail, it is possible to unlatch the fastening catch via the center rather than via the edges as is the case for the fastening catches of the prior art.

The present invention also relates to an electrical connection device which comprises a fastening catch as described hereinabove. Such an electrical connection device preferably comprises a housing in which is made a central hole substantially perpendicular to the direction of movement of the sliding pieces of the fastening catch, this hole allowing access to the fastening catch from the top of the housing.

In any event, the invention will be clearly understood with the aid of the description which follows with reference to the appended diagrammatic drawing representing by way of non-limiting examples two embodiments of a bistable catch according to the invention.

Figure 2:
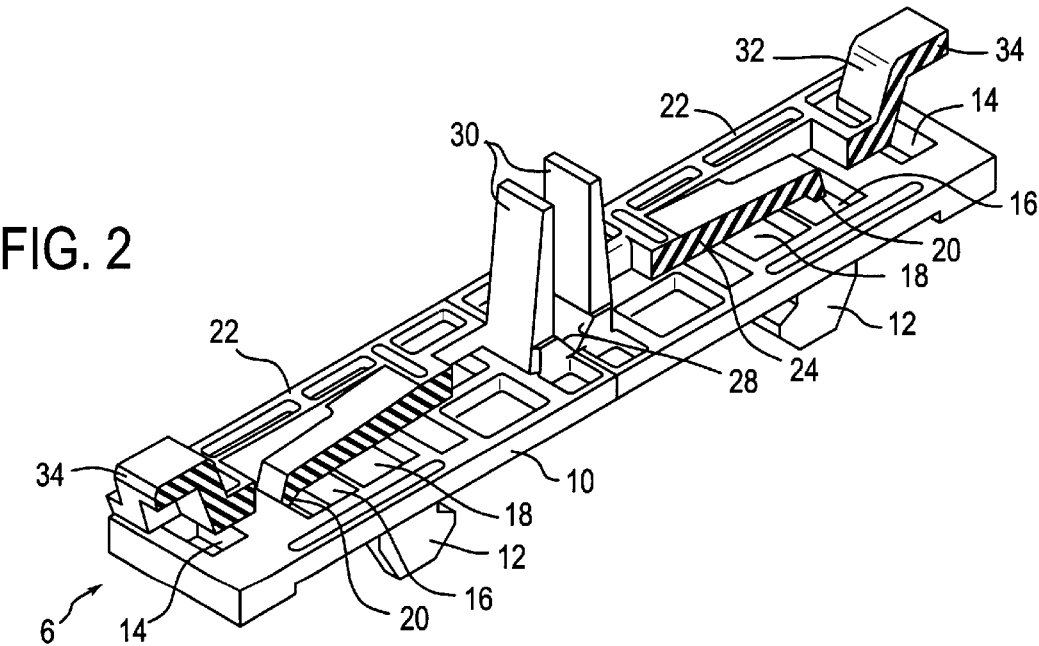
Figure 3:
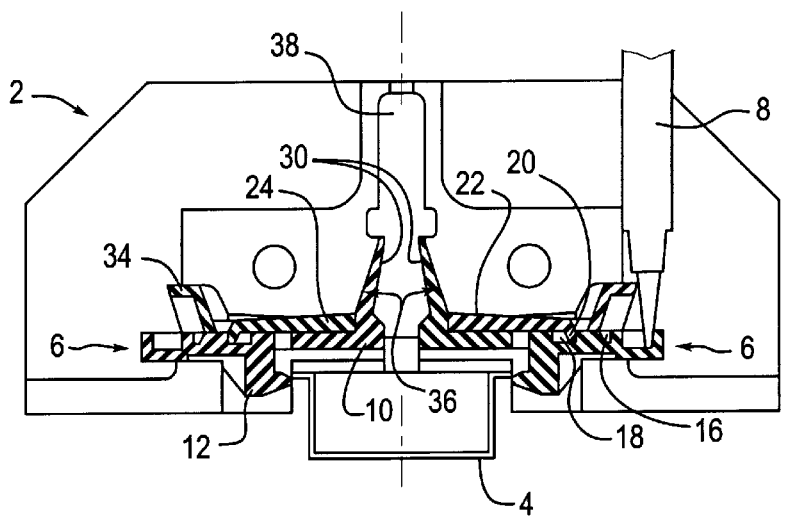
Figure 4:
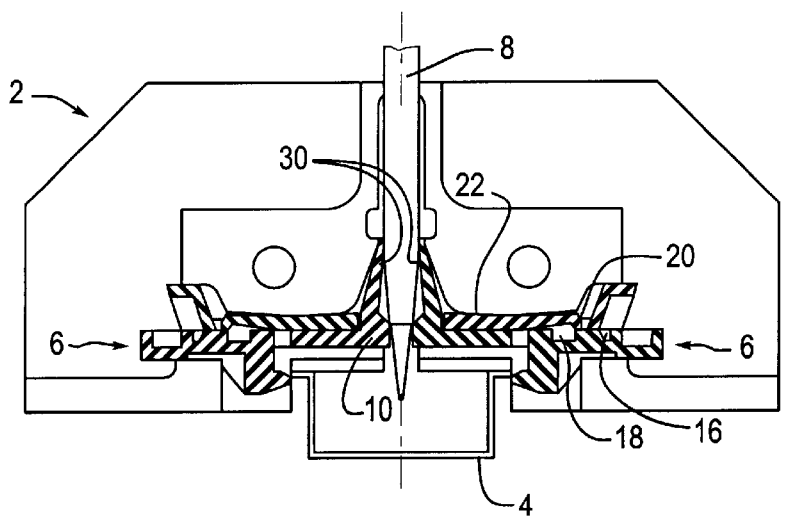
Figure 5:
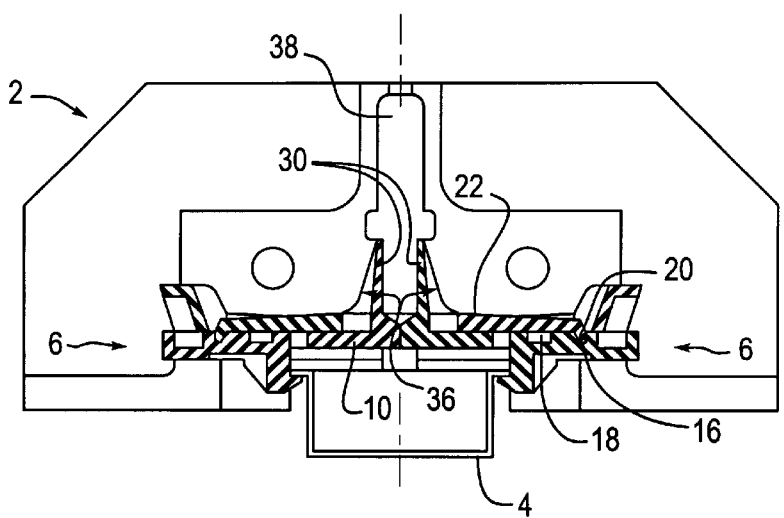
Figure 6:
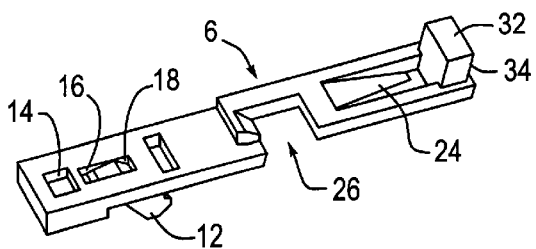
Figure 7:
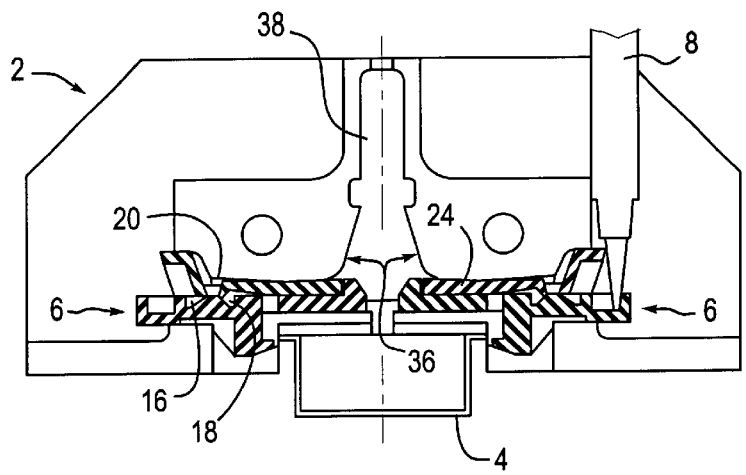
Figure 8:
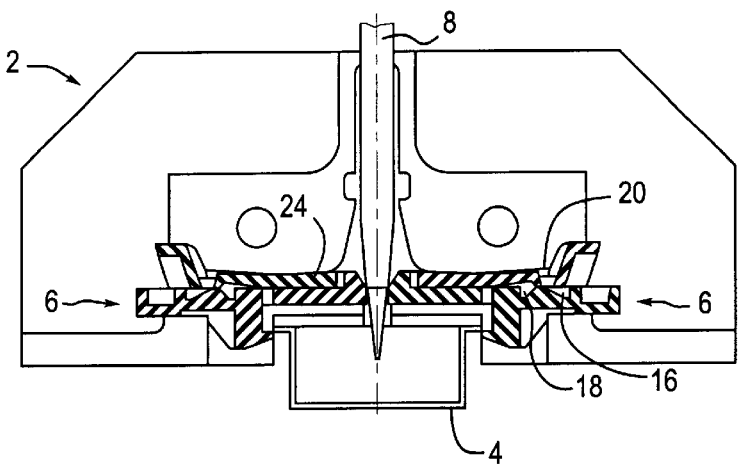
Figure 9:
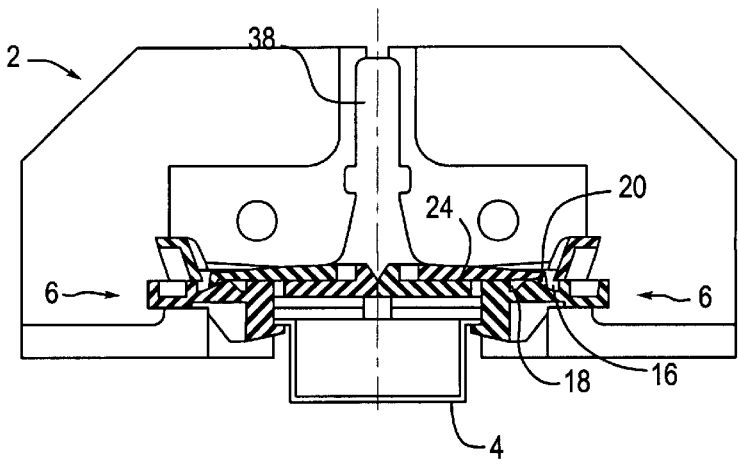

FIG. 1 is a partially cutaway perspective view of a constituent piece of a catch according to the invention, FIG. 2 is a likewise partially cutaway perspective view showing two pieces of FIG. 1, nested together, FIGS. 3 to 5 show in side view, at reduced scale, the catch of FIG. 2 mounted in a terminal block, FIG. 6 is a perspective view of a constituent piece of a bistable catch according to a variant embodiment, and FIGS. 7 to 9 are side views corresponding to FIGS. 3 to 5 for this second embodiment of a bistable catch according to the invention.

FIG. 3 shows a housing 2 of an electrical connection device, for example a terminal block, placed on a support rail 4. This terminal block comprises a fastening catch consisting of two sliding pieces 6 such as those which may be seen in perspective and partially cutaway in FIG. 1. This fastening catch allows the latching and unlatching of the housing 2 on the support rail 4. It is actuated by the end of a screw-driver 8.

The support rail 4 is a conventional support rail such as is known to the person skilled in the art. It consists of a profiled rail of U section, free ends of the branches of the U being folded back toward the outside. The cross section of this profile recalls the shape of a hat.

FIG. 1 shows in detail a sliding piece 6 in perspective. This sliding piece comprises two elongate plates disposed one following the other in the longitudinal direction but with a heightwise offset corresponding substantially to the thickness of an elongate plate.

A first elongate plate 10 is of substantially rectangular outline. On its lower face it carries a hook 12. The latter is intended to be brought into place under a folded-back edge of the support rail 4 so that this folded-back edge is sandwiched between the hook 12 and the first elongate plate 10.

The upper face, away from the hook 12, of the first elongate plate 10 exhibits, in proximity to its free end a recess 14 intended to receive the end of the blade of the screw-driver 8. This upper face also comprises two transverse grooves 16 and 18 intended to cooperate with an elastic hook 20 described later. The grooves 16 and 18 run transversely with respect to the plate 10. Other hollows may be observed in the first elongate plate 10. These hollows are made so as to make a saving of material. This sliding piece 6 is made by molding from a synthetic material and in order to reduce the cost of making this piece hollows are provided. One may allow oneself such hollows since the sliding pieces do not undergo high mechanical stresses.

The second elongate plate 22 runs in the same direction as the first elongate plate 10 and it extends the latter although with a heightwise offset. This second elongate plate 22 is offset toward the top with respect to the first plate 10.

The elastic hook 20 is made in this second elongate plate 22. This elastic hook is obtained by cutting out from the second elongate plate 22. An elongate dog 24 is thus made in the longitudinal direction, the free end of which is curved downward so as to form a hook.

On the first elongate plate 10 side, the second elongate plate 22 exhibits a notch 26 emerging laterally and which penetrates the plate 22 over more than half the width of the latter. The edge of this notch, located on the first elongate plate 10 side, is beveled on the upper face of the second elongate plate 22. An elastic blade 30 runs upward at the level of this beveled edge 28.

The free end of the second elongate plate 22 exhibits a boss 32 so as to exhibit a raised rim 34.

Hollows may be seen on the second elongate plate 22. Like the hollows of the first elongate plate 10, these hollows are made so as to save material when molding the sliding piece 6.

To make a fastening catch, one uses two sliding pieces which are nested together in such a way as to place the first elongate plate 10 of a sliding piece 6 under the second elongate plate 22 of the other sliding piece 6. Such an assembly is represented in perspective in FIG. 2. In order that the various parts thus represented of the fastening catch may be better seen, a zone of each sliding piece has been removed. The removed zone is identical to the remaining zone. The two pieces 6 thus mounted can slide longitudinally. The travel of the movement is given by the width of the notch 26. In the latched position, the two beveled edges 28 are located one against the other (FIGS. 2 and 5) whilst in the unlatched position the second elongate plates 22 abut against the edges opposite the beveled edges 28 of the notches 26 (FIG. 3).

The transverse snap-engagement grooves 16 and 18 are placed in such a way on the first plates 10 that the elastic hook 20 of the other sliding piece 6 is located in the transverse groove 16 in the latched position and in the transverse groove 18 in the unlatched position.

FIGS. 3 to 5 show the fastening catch described hereinabove mounted in the housing 2 of a terminal block.

FIG. 3 shows the latching catch in the unlatched position. The hooks 12 of the sliding pieces 6 are therefore parted from one another. The elastic hooks 20 are each located in a snap-engagement groove 18. This position is a stable position even if the elastic blades 30 exert on the remainder of each sliding piece 6 a stress tending to shift the fastening catch from the unlatched position to the latched position.

So that the elastic blades 30 exert a stress on the sliding pieces 6, stops 36 are provided in the housing 2. These stops 36 exhibit the form of an inclined plane. At rest, the elastic blades 30 run substantially vertically. This rest position corresponds to the latched position represented in FIG. 5. The upper free ends of the elastic blades 30 are then in contact with the upper part of the stops 36. When the fastening catch shifts into the unlatched position, the elastic blades separate from one another. By virtue of the stops 36, the free end of the elastic blades 30 does not move whilst the base of these elastic blades moves with the remainder of the sliding piece 6. In the unlatched position (FIG. 3), each elastic blade 30 substantially hugs the stop-forming corresponding inclined surface 36.

As already indicated previously, the unlatched position is a stable position since each elastic hook 20 is captured in a corresponding snap-engagement groove 18. There is no need to retain the screw-driver 8 in the position represented in FIG. 3 in order to keep the fastening catch in the unlatched position. To shift from the unlatched position to the latched position, it is sufficient to push on one end of a sliding piece 6 toward the support rail 4 so as to unsnap the elastic hook 20 from the corresponding snap-engagement groove 18. The elastic blades 30 then return the sliding pieces to the latched position. The elastic hooks 20 are then captured in the snap-engagement grooves 16 as shown in FIG. 5. This latched position is also a stable position.

To shift from the latched position to the unlatched position, it is necessary to part the hooks 12. It is then, for example, possible to bring the end of the blade of the screw-driver 8 into one of the two recesses 14 and, by bearing on the raised rim 34 of the other sliding piece, one pulls one sliding piece 6 and pushes the other. The elastic hooks 20 then come out of the corresponding transverse grooves 16 and are brought into place in the snap-engagement notches 18. One is then in the position represented in FIG. 3.

Another solution consists in passing the screw-driver through a keyway 38 made for this purpose in the housing 2. This keyway runs in line with the beveled edges 28. These beveled edges then allow the end of the blade of the screw-driver 8 to be introduced between the two sliding pieces 6, as represented in FIG. 4. The sliding pieces 6 are then in an intermediate position. The elastic hooks 20 are located between the snap-engagement grooves 16 and the snap-engagement grooves 18. It is then sufficient to twist the screw-driver 8, by at least 90°, in order to return the sliding pieces to the unlatched position represented in FIG. 3.

As may be seen, this fastening catch exhibits numerous advantages. It can be actuated laterally or from the center. Thus, when the housing 2 is mounted on the support rail 4 and the connections are made, it is sometimes difficult to get access between the wires connected to the edges of the housing 2. With the new fastening catch according to the invention, as described above, it is then possible to unlatch the housing from the support rail via the center. It may also be noted that the fastening catch may be accessed equally well from either side. Moreover, a single maneuver is sufficient to move the two hooks 12. The housing 2 is thus freed from the rail 4 in a single operation. This fastening catch also exhibits the advantage, and this is not the least, of being stable both in the latched position and in the unlatched position. This allows very great convenience of use for the operator who needs to mount the housing on the support rail and dismount it therefrom.

This fastening catch is also easy to make. As indicated above, it consists of two pieces made of a molded synthetic material. Moreover, these two pieces are strictly identical. A single mold is therefore sufficient and the mounting operation is greatly simplified.

FIGS. 6 to 9 show a variant embodiment of a fastening catch according to the invention. The same references are used here to denote similar pieces.

The essential difference between the bistable catch of FIGS. 1 to 5 and the bistable catch of FIGS. 6 to 9 is the absence of an elastic blade in the second embodiment. Apart from this difference, the structure is similar. There are two identical sliding pieces 6. Each of these sliding pieces includes a first elongate plate 10 furnished with a recess 14 intended to receive the free end of a screw-driver and two snap-engagement grooves 16 and 18, as well as a second elongate plate 22 in which is made a notch 26 as well as an elastic dog 24 carrying an elastic hook 20. There are also a boss 32 and a raised rim 34.

The manner of operation of this bistable catch is substantially identical except that there is no elastic restoring force toward the latched position. The latch effect is then less significant. However, given that in the latched position the two sliding pieces snap-engage with one another, there is nevertheless good latching.

An advantage of this embodiment relative to the first embodiment is the heightwise space saving. This second embodiment can be used when the room available heightwise is limited.

This second embodiment includes the same advantages as those described hereinabove with reference to the first embodiment.

As goes without saying, the invention is not limited to the two embodiments described hereinabove by way of non-limiting example; on the contrary it encompasses all variants thereof within the framework of the claims hereinafter.

Thus for example, it would be quite possible to have two sliding pieces which are not identical. It would be quite possible to obtain a similar manner of operation with two different pieces.

Two snap-engagement grooves need not necessarily be provided on each sliding piece. Indeed, it may be noted that the snap-engagement groove corresponding to the latched position could be dispensed with when the fastening catch is prestressed in the latched position.

Means other than elastic blades may be employed to ensure a prestress toward the latched position. It would, for example, be possible to use a metal spring, for example a helical spring, which would be linked at one of its ends to a sliding piece and at its other end to the other sliding piece. Even when using elastic blades, the latter could be placed differently and even exhibit a different form from that shown in the drawing.

What is claimed is:

1. A catch for fastening an electrical housing to a support rail comprising a first piece and a second piece sliding relatively to each other between a latched position and an unlatched position, wherein:

a hook to allow latching on the support rail, and
snap-engagement means,
the second piece comprises:
a hook to allow latching on the support rail, and
snap-engagement means complementary to the snap-engagement means of the first piece,
the snap-engagement means of the first and second sliding pieces cooperate at least when the sliding pieces are in the unlatched position to restrain the sliding movement of the first and second sliding pieces.

2. The catch for fastening an electrical housing to a support rail as claimed in claim 1, wherein the snap-engagement means of the first and second sliding pieces cooperate when the sliding pieces are in the latched position in order to restrain the sliding movement of the first and second sliding pieces.

3. The catch for fastening an electrical housing to a support rail as claimed in claim 1, wherein:
the two sliding pieces overlap;
the first sliding piece comprises at one of its ends a recess intended to receive the blade of a screw-driver; and
the second sliding piece exhibits at the height of the recess of the first sliding piece a raised rim to serve as bearing for the screw-driver.

4. The catch for fastening an electrical housing to a support rail as claimed in claim 1, wherein each sliding piece comprises an elastic blade running perpendicularly to directions of movement of the first and second sliding pieces and is adapted to bear against an inside wall of the housing in such a way as to prestress each sliding piece toward the latched position.

5. The catch for fastening an electrical housing to a support rail as claimed in claim 1, wherein:
the snap-engagement means of the first sliding piece comprises a hook elastically movable in a direction substantially perpendicular to directions of movement of the sliding pieces;
and the complementary snap-engagement means of the second sliding piece comprises one groove that receives the end of the hook of the snap-engagement means of the first sliding piece in the latched position and one groove that receives the end of the hook of the snap-engagement means of the first sliding piece in the unlatched position.

6. The catch for fastening an electrical housing to a support rail as claimed in claim 5, wherein the hook of the snap-engagement means is disposed at the end of an elastic dog portion of the first sliding piece.

7. The catch for fastening an electrical housing to a support rail as claimed in claim 1, wherein:
the two sliding pieces are identical;
each sliding piece exhibits the form of an elongate plate;
the two sliding pieces are disposed one along the extension of the other with a heightwise offset; and
a lateral notch allowing the nesting of the two sliding pieces is provided substantially in the middle of each sliding piece.

8. The catch for fastening an electrical housing to a support rail as claimed in claim 7, wherein the edge of the notch of each piece is beveled, so that in the latched position the beveled edges of the notches face each other.

9. An electrical connection device comprising an insulating housing and a catch for fastening the housing to a support rail, wherein:
the catch comprises a first piece and a second piece sliding relatively to each other in directions between a latched position and an unlatched position, wherein:

the first piece comprises:
  a hook to allow latching on the support rail, and
  snap-engagement means;
the second piece comprises:
  a hook intended to allow latching on the support rail, and
  snap-engagement means complementary to the snap-engagement means of the first piece,
the snap-engagement means of the first and second sliding pieces cooperate at least when the sliding pieces are in the unlatched position to restrain the sliding movement of the first and second sliding pieces.

10. The electrical connection device as claimed in claim 9, wherein the snap-engagement means of the first and second sliding pieces cooperate when the sliding pieces are in the latched position to restrain the sliding movement of the first and second sliding pieces.

11. The electrical connection device as claimed in claim 9, wherein:
  the two sliding pieces overlap;
  the first sliding piece comprises at one of its ends a recess to receive the blade of a screw-driver; and
  the second sliding piece exhibits at the height of the recess of the first sliding piece a raised rim to serve as bearing for the screw-driver.

12. The electrical connection device as claimed in claim 9, wherein each sliding piece comprises an elastic blade running substantially perpendicularly to directions of movement of the first and second sliding pieces to bear against an inside wall of the housing to prestress each sliding piece toward the latched position.

13. The electrical connection device as claimed in claim 9, wherein a hole is located in the housing to allow access to the fastening catch.

14. The electrical connection device as claimed in claim 9, wherein
  the snap-engagement means of the first sliding piece comprises a hook elastically movable in a direction substantially perpendicular to directions of movement of the sliding pieces; and
  the complementary snap-engagement means of the second sliding piece comprises one groove to receive the end of the hook of the snap-engagement means of the first sliding piece in the latched position and one groove to receive the end of the hook of the snap-engagement means of the first sliding piece in the unlatched position.

15. The electrical connection device as claimed in claim 14, wherein the hook of the snap-engagement means is disposed at the end of an elastic dog portion of the first sliding piece.

16. The electrical connection device as claimed in claim 9, wherein:
  the two sliding pieces are identical;
  each sliding piece exhibits the form of an elongate plate;
  the two sliding pieces are disposed one along the extension of the other with a heightwise offset; and
  a lateral notch allowing the nesting of the two sliding pieces is provided substantially in the middle of each sliding piece.

17. The electrical connection device as claimed in claim 16, wherein the edge of the notch of each piece is beveled, so that in the latched position each beveled edge faces the other.

* * * * *